US012749679B2

(12) United States Patent
Garrick et al.

(10) Patent No.: US 12,749,679 B2
(45) Date of Patent: Sep. 29, 2026

(54) CATHODE WITH A COMPOSITE NICKEL STRUCTURE AND METHOD TO MANUFACTURE THE SAME

(71) Applicant: GM GLOBAL TECHNOLOGY OPERATIONS LLC, Detroit, MI (US)

(72) Inventors: Taylor R. Garrick, Bloomfield Hills, MI (US); Ryan P. Hickey, Austin, TX (US)

(73) Assignee: GM Global Technology Operations LLC, Detroit, MI (US)

( * ) Notice: Subject to any disclaimer, the term of this patent is extended or adjusted under 35 U.S.C. 154(b) by 517 days.

(21) Appl. No.: 18/090,820

(22) Filed: Dec. 29, 2022

(65) Prior Publication Data

US 2024/0222618 A1 Jul. 4, 2024

(51) Int. Cl.

| | |
|---|---|
| ***H01M 4/525*** | (2010.01) |
| ***H01M 4/04*** | (2006.01) |
| ***H01M 4/505*** | (2010.01) |
| ***H01M 4/66*** | (2006.01) |
| ***H01M 50/105*** | (2021.01) |
| *H01M 4/02* | (2006.01) |

(52) U.S. Cl.

CPC ......... *H01M 4/525* (2013.01); *H01M 4/0404* (2013.01); *H01M 4/0435* (2013.01); *H01M 4/505* (2013.01); *H01M 4/661* (2013.01); *H01M 50/105* (2021.01); *H01M 2004/028* (2013.01)

(58) Field of Classification Search

CPC .. H01M 4/525; H01M 4/0404; H01M 4/0435; H01M 4/505; H01M 4/661; H01M 50/105; H01M 2004/028; H01M 4/131; H01M 4/1391; H01M 4/5825; H01M 4/62; Y02E 60/10

See application file for complete search history.

(56) References Cited

U.S. PATENT DOCUMENTS

| | | | | |
|---|---|---|---|---|
| 2008/0020279 A1* | 1/2008 | Schmidt | H01M 4/485 429/231.95 |
| 2017/0250445 A1* | 8/2017 | Burkhardt | H01M 10/0569 |
| 2021/0143501 A1* | 5/2021 | Park | H01M 4/52 |
| 2021/0151260 A1* | 5/2021 | Kong | H01G 11/86 |
| 2022/0020984 A1* | 1/2022 | Kang | H01M 4/505 |
| 2022/0393226 A1* | 12/2022 | Dong | H01M 4/364 |
| 2022/0407112 A1* | 12/2022 | Dai | H01M 10/0569 |
| 2024/0178441 A1* | 5/2024 | Kim | H01M 4/382 |
| 2025/0030006 A1* | 1/2025 | Ho | H01M 4/621 |

* cited by examiner

*Primary Examiner* — Michael Y Sun

(74) *Attorney, Agent, or Firm* — Quinn IP Law

(57) ABSTRACT

A cathode with a composite nickel structure for use in a battery cell is provided. The cathode includes a current collector including a first side and a second side. The cathode further includes a first cathode electrode coating the first side of the current collector. The first cathode electrode includes a first relatively higher concentration of nickel. The cathode further includes a second cathode electrode coating the second side of the current collector. The second cathode electrode includes one of a second relatively lower concentration of nickel as compared to the first cathode electrode or a nickel-free material.

20 Claims, 3 Drawing Sheets

CATHODE WITH A COMPOSITE NICKEL STRUCTURE AND METHOD TO MANUFACTURE THE SAME

INTRODUCTION

The disclosure generally relates to a cathode with a composite nickel structure and a method to manufacture the same.

A battery system includes a plurality of battery cells. Each battery cell includes an anode, a cathode, a separator, and an electrolyte. A battery cell may operate in charge mode, receiving electrical energy. A battery cell may operate in discharge mode, providing electrical energy. A battery cell may operate through charge and discharge cycles, where the battery first receives and stores electrical energy and then provides electrical energy to a connected system. In vehicles utilizing electrical energy to provide motive force, battery cells of the vehicle may be charged, and then the vehicle may navigate for a period of time, utilizing the stored electrical energy to generate motive force.

SUMMARY

A cathode with a composite nickel structure for use in a battery cell is provided. The cathode includes a current collector including a first side and a second side. The cathode further includes a first cathode electrode coating the first side of the current collector, wherein the first cathode electrode includes a first relatively higher concentration of nickel. The cathode further includes a second cathode electrode coating the second side of the current collector, wherein the second cathode electrode includes a second relatively lower concentration of nickel as compared to the first cathode electrode.

In some embodiments, the first cathode electrode includes lithium nickel manganese cobalt oxide, $LiNi_{0.8}Co_{0.1}Mn_{0.1}O_2$ (NMC811).

In some embodiments, the first cathode electrode includes lithium nickel manganese cobalt oxide, $LiNi_{0.6}Mn_{0.2}Co_{0.2}O_2$ (NMC622).

In some embodiments, the first cathode electrode includes lithium nickel manganese cobalt oxide, $LiNi_{0.8}Co_{0.1}Mn_{0.1}O_2$ (NMC811), wherein the lithium nickel manganese cobalt oxide, $LiNi_{0.8}Co_{0.1}Mn_{0.1}O_2$ (NMC811), is present in a range from one percent by mass of the first cathode electrode to ninety-six percent by mass of the first cathode electrode. The first cathode electrode further includes lithium nickel manganese cobalt oxide, $LiNi_{0.6}Mn_{0.2}Co_{0.2}O_2$ (NMC622), wherein the lithium nickel manganese cobalt oxide, $LiNi_{0.6}Mn_{0.2}Co_{0.2}O_2$, (NMC622), is present in a range from one percent by mass of the first cathode electrode to ninety-six percent by mass of the first cathode electrode.

In some embodiments, the first cathode electrode includes lithium nickel manganese cobalt oxide, $LiNi_{0.6}Mn_{0.2}Co_{0.2}O_2$ (NMC622), wherein the lithium nickel manganese cobalt oxide, $LiNi_{0.6}Mn_{0.2}Co_{0.2}O_2$ (NMC622), is present in a range from one percent by mass of the first cathode electrode to ninety-six percent by mass of the first cathode electrode. The first cathode electrode further includes lithium nickel manganese cobalt oxide, $Li_{1.05}Ni_{0.33}Mn_{0.33}Co_{0.33}O_2$ (NMC111), wherein the lithium nickel manganese cobalt oxide, $Li_{1.05}Ni_{0.33}Mn_{0.33}Co_{0.33}O_2$ (NMC111), is present in a range from one percent by mass of the first cathode electrode to ninety-six percent by mass of the first cathode electrode.

In some embodiments, the first cathode electrode includes lithium nickel manganese cobalt oxide, $LiNi_{0.8}Co_{0.1}Mn_{0.1}O_2$ (NMC811), wherein the lithium nickel manganese cobalt oxide, $LiNi_{0.8}Co_{0.1}Mn_{0.1}O_2$ (NMC811), is present in a range from one percent by mass of the first cathode electrode to ninety-six percent by mass of the first cathode electrode. The first cathode electrode further includes lithium nickel manganese cobalt oxide, $Li_{1.05}Ni_{0.33}Mn_{0.33}Co_{0.33}O_2$ (NMC111), wherein the lithium nickel manganese cobalt oxide, $Li_{1.05}Ni_{0.33}Mn_{0.33}Co_{0.33}O_2$ (NMC111), is present in a range from one percent by mass of the first cathode electrode to ninety-six percent by mass of the first cathode electrode.

In some embodiments, the second cathode electrode includes lithium nickel manganese cobalt oxide, $Li_{1.05}Ni_{0.33}Mn_{0.33}Co_{0.33}O_2$ (NMC111).

In some embodiments, the second cathode electrode includes lithium iron phosphate.

In some embodiments, the second cathode electrode includes lithium manganese oxide.

In some embodiments, the second cathode electrode includes lithium nickel manganese cobalt oxide, $Li_{1.05}Ni_{0.33}Mn_{0.33}Co_{0.33}O_2$ (NMC111), wherein the lithium nickel manganese cobalt oxide is present in a range from one percent by mass of the second cathode electrode to ninety-six percent by mass of the second cathode electrode. The second cathode electrode further includes lithium iron phosphate, wherein the lithium iron phosphate is present in range from one percent by mass of the second cathode electrode to ninety-six percent by mass of the second cathode electrode. The second cathode electrode further includes lithium manganese oxide, wherein the lithium manganese oxide is present in a range from one percent by mass of the second cathode electrode to ninety-six percent by mass of the second cathode electrode.

In some embodiments, the first cathode electrode includes lithium nickel manganese cobalt oxide, $LiNi_{0.8}Co_{0.1}Mn_{0.1}O_2$ (NMC811) and lithium nickel manganese cobalt oxide, $LiNi_{0.6}Mn_{0.2}Co_{0.2}O_2$ (NMC622). The second cathode electrode includes lithium nickel manganese cobalt oxide, $Li_{1.05}Ni_{0.33}Mn_{0.33}Co_{0.33}O_2$ (NMC111), lithium iron phosphate, and lithium manganese oxide.

According to one alternative embodiment, a battery cell including a cathode with a composite nickel structure is provided. The battery cell includes an anode and a cathode. The cathode includes a current collector including a first side and a second side and a first cathode electrode coating the first side of the current collector. The first cathode electrode includes a first relatively higher concentration of nickel. The cathode further includes a second cathode electrode coating the second side of the current collector. The second cathode electrode includes one of a second relatively lower concentration of nickel as compared to the first cathode electrode or a nickel-free material. The battery cell further includes a separator and an electrolyte.

In some embodiments, the first cathode electrode includes lithium nickel manganese cobalt oxide, $LiNi_{0.8}Co_{0.1}Mn_{0.1}O_2$ (NMC811).

In some embodiments, the first cathode electrode includes lithium nickel manganese cobalt oxide, $LiNi_{0.6}Mn_{0.2}Co_{0.2}O_2$ (NMC622).

In some embodiments, the second cathode electrode includes lithium nickel manganese cobalt oxide, $Li_{1.05}Ni_{0.33}Mn_{0.33}Co_{0.33}O_2$ (NMC111).

In some embodiments, the second cathode electrode includes lithium iron phosphate.

In some embodiments, the second cathode electrode includes lithium manganese oxide.

In some embodiments, the battery cell is configured as a pouch cell, and the cathode current collector includes a conductive metal foil.

According to one alternative embodiment, a method for manufacturing a cathode with a composite nickel structure is provided. The method includes applying a first cathode electrode material to a first side of a cathode current collector and drying the first cathode electrode material to the cathode current collector. The method further includes calendaring the first cathode electrode material and the cathode current collector. The method further includes applying a second cathode electrode material to a second side of a cathode current collector and drying the second cathode electrode material to the cathode current collector. The method further includes calendaring the first cathode electrode material, second cathode electrode material, and the cathode current collector. The first cathode electrode material includes a relatively higher nickel concentration and the second cathode electrode material includes one of a second relatively lower nickel concentration as compared to the first cathode electrode material or a nickel-free material.

In some embodiments, the first cathode electrode material includes lithium nickel manganese cobalt oxide, $LiNi_{0.8}Co_{0.1}Mn_{0.1}O_2$ (NMC811) and lithium nickel manganese cobalt oxide, $LiNi_{0.6}Mn_{0.2}Co_{0.2}O_2$ (NMC622). The second cathode electrode material includes lithium nickel manganese cobalt oxide, $Li_{1.05}Ni_{0.33}Mn_{0.33}Co_{0.33}O_2$ (NMC111), lithium iron phosphate, and lithium manganese oxide.

The above features and advantages and other features and advantages of the present disclosure are readily apparent from the following detailed description of the best modes for carrying out the disclosure when taken in connection with the accompanying drawings.

DETAILED DESCRIPTION

Figure 1:
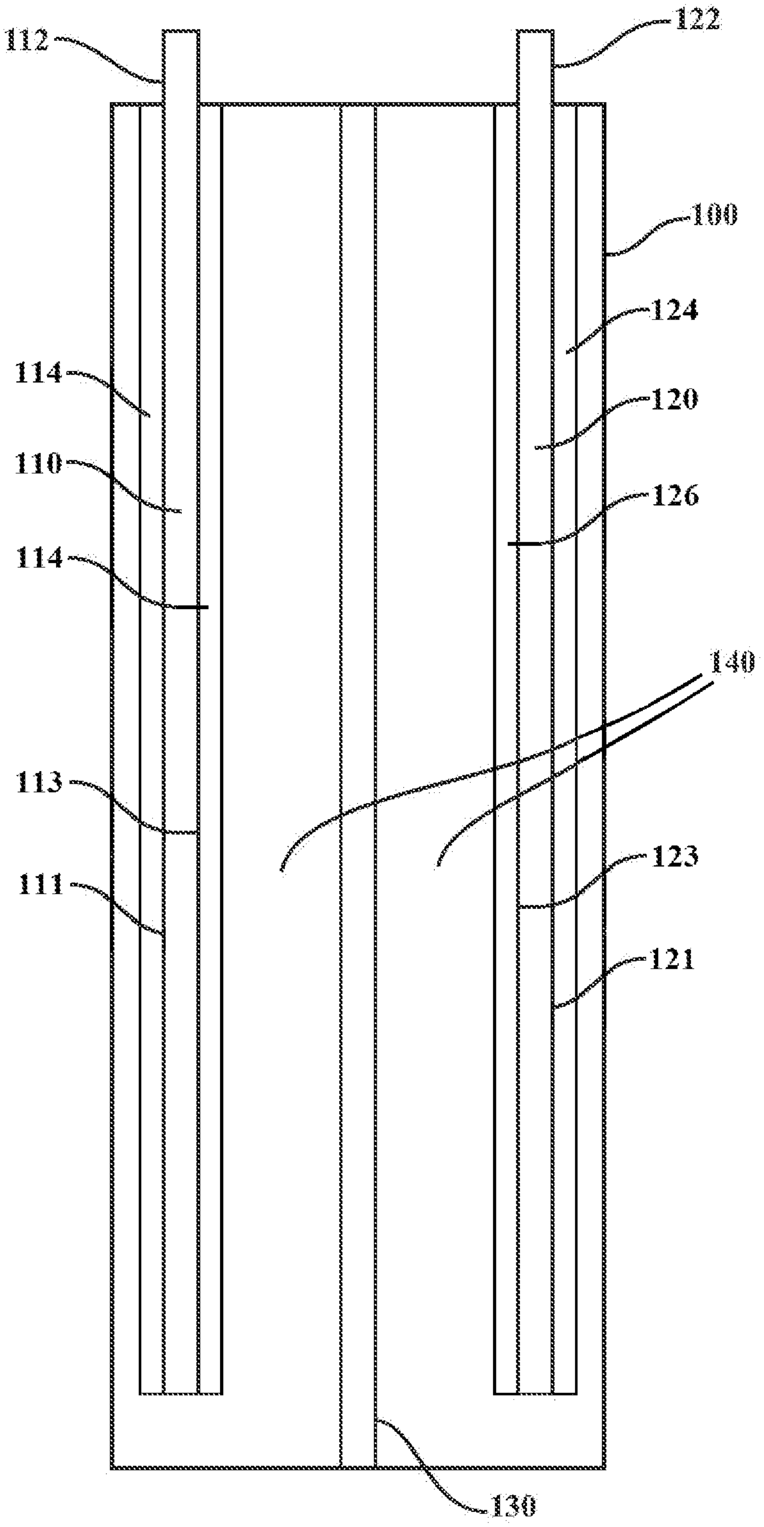
FIG. 1 schematically illustrates an exemplary battery cell embodied as a pouch cell, including an anode, a cathode, a separator, and an electrolyte, in accordance with the present disclosure.

A cathode includes a current collector and a cathode electrode. For a pouch cell, the current collector may be a planar piece of conductive metallic material. The current collector may be metallic foil. The cathode electrode may be coating on both sides of the current collector.

A blended pouch cell design with two distinct cathode electrode materials is provided. A first cathode electrode material may include a relatively high nickel concentration. A second cathode electrode material may include a relatively low nickel concentration. In one embodiment, the second cathode electrode material may be nickel-free or may have no nickel present. The first cathode electrode material may be coated on one side of a current collector of the cathode, and second cathode electrode material may be coated on a second side of the current collector. This two electrode material configuration results in high power performance at high states of charge and a tradeoff between high energy performance and medium power performance at lower states of charge.

The first cathode electrode material including the relatively high nickel concentration may respond initially during a discharge cycle. The second cathode electrode material including the relatively low nickel concentration may respond after the initial discharge cycle is initiated.

The disclosed configuration includes low energy and high energy alternating coatings. This configuration lowers a magnitude of thermal energy releases and provides resistance to thermal events spreading from one battery cell to adjacent battery cells.

In one embodiment, one may tailor the coating ratios to reduce thermal event energy release based on a "cost" function for a particular program implementation, without having to source or blend new active materials. The coating ratios may be tuned to meet thermal event prevention requirements without having to change the packaging, or module/pack design.

In one embodiment, the first cathode electrode material including the relatively high nickel concentration may include lithium nickel manganese cobalt oxide, $LiNi_{0.8}Co_{0.1}Mn_{0.1}O_2$ (NMC811). The first cathode electrode material may additionally or alternatively include lithium nickel manganese cobalt oxide, $LiNi_{0.6}Mn_{0.2}Co_{0.2}O_2$ (NMC622). The first cathode electrode material may further include a conductive filler material and a binder material.

In one embodiment, the second cathode electrode material including relatively low nickel concentration may include lithium nickel manganese cobalt oxide, $Li_{1.05}Ni_{0.33}Mn_{0.33}Co_{0.33}O_2$ (NMC111). The second cathode electrode material may additionally or alternatively include lithium iron phosphate (LFP). The second cathode electrode material may additionally or alternatively include lithium-ion manganese oxide (LMO). The first cathode electrode material may further include a conductive filler material and a binder material.

In one embodiment, a method to manufacture the disclosed cathode may include coating a first side of a cathode current collector with a relatively high concentration nickel material. This first side and the coating thereupon may be dried and calendared. The method may further include coating a second side of the cathode current collector with a second cathode material. The second cathode material may include a relatively low nickel concentration or may be nickel-free. The second side and the coating thereupon may be dried and calendared.

The coating ratios may be tailored to reduce thermal event energy release based on a "cost" function for a particular program implementation, without having to source or blend new active materials. Battery pack level performance may be optimized by proximity to failure of thermal event requirements by altering the ratio of the two cathode materials at the battery cell level with the same module and pack level packaging.

In some embodiments, the anode may be configured to compliment the disclosed cathode. For example, aspects of the anode including loading, thickness, porosity, and other similar features may be selected to match the cathode that the anode directly faces.

Referring now to the drawings, wherein like reference numbers refer to like features throughout the several views, FIG. 1 schematically illustrates an exemplary battery cell 100 embodied as a pouch cell, including an anode 110, a cathode 120, a separator 130, and an electrolyte 140. The battery cell 100 enables converting electrical energy into stored chemical energy in a charging cycle, and the battery cell 100 enable converting stored chemical energy into electrical energy in a discharging cycle. The anode 110 includes a current collector 112. The current collector 112 may include a conductive metallic planar piece, including a first side and a second side. An anode electrode 114 is provided as a first layer of material upon the first side and a second layer of material upon the second side. The anode electrode 114 may include a silicon-based active material.

The cathode 120 includes a current collector 122. The current collector 122 may include a conductive metallic planar piece, including a first side 121 and a second side 123. The cathode 120 includes a composite nickel structure or a plurality of electrodes attached or coated thereto with different nickel concentrations there within. A first cathode electrode 124 provided as a layer of material upon the first side 121. A second cathode electrode 126 is provided as a layer of material upon the second side 123. The cathode electrode may include a nickel-based active material. The first cathode electrode 124 may include a first electrode composition. The second cathode electrode 126 may include a second electrode composition. The first electrode composition and the second electrode composition may include different nickel concentrations in accordance with the disclosure.

In one embodiment, a relatively high concentration of nickel may be present in the first electrode composition of the first cathode electrode 124, and a relatively low concentration of nickel may be present in the second electrode composition of the second cathode electrode 126. In another embodiment, the nickel concentrations may be reversed, with the first electrode composition of the first cathode electrode 124 of FIG. 1 including a relatively low concentration of nickel and with the second electrode composition of the second cathode electrode 126 of FIG. 1 including a relatively high concentration of nickel.

The separator 130 is operable to separate the anode 110 from the cathode 120 and to enable ion transfer through the separator 130. The electrolyte 140 is a liquid or gel that provides a lithium-ion conduction path between the anode 110 and the cathode 120.

Figure 2:
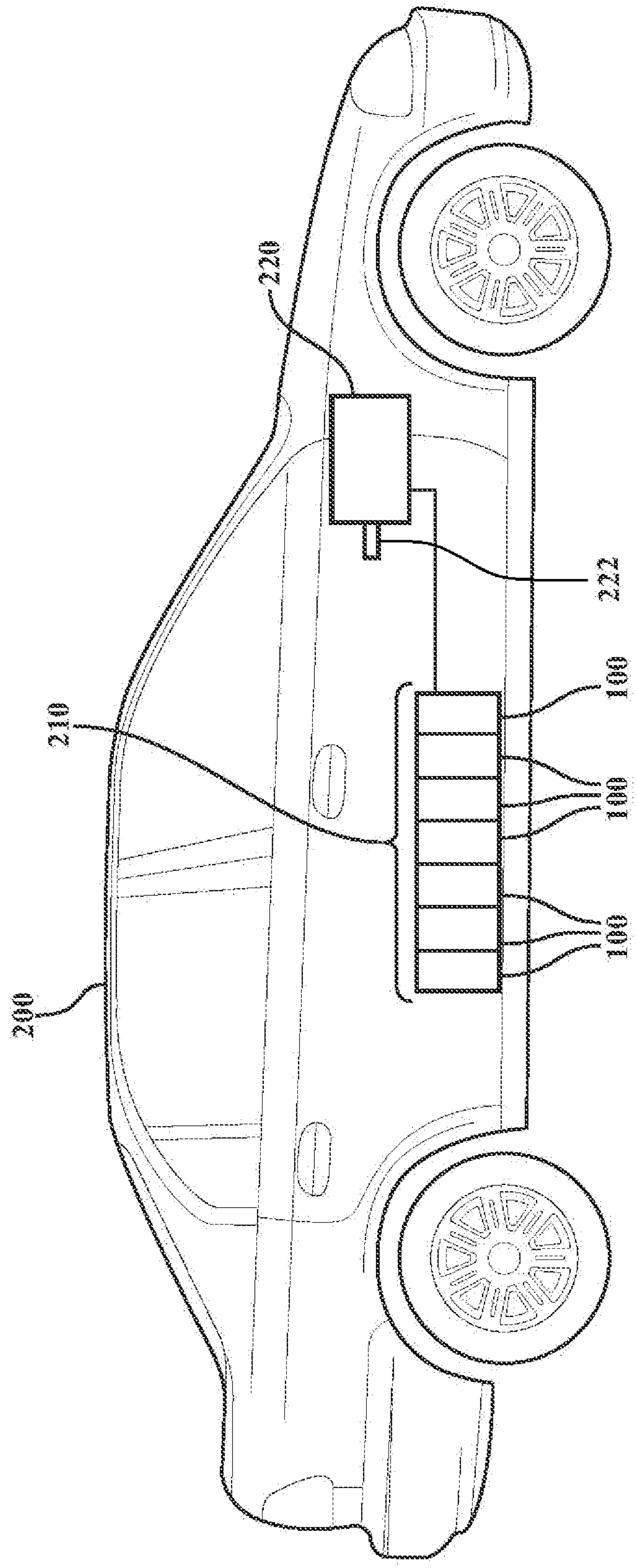
FIG. 2 schematically illustrates an exemplary device, e.g., a battery electric vehicle, including a battery pack that includes a plurality of battery cells, in accordance with the present disclosure.

The battery cell 100 may be utilized in a wide range of applications and powertrains. FIG. 2 schematically illustrates an exemplary device 200, e.g., a battery electric vehicle (BEV), including a battery pack 210 that includes a plurality of battery cells 100. The plurality of battery cells 100 may be connected in various combinations, for example, with a portion being connected in parallel and a portion being connected in series, to achieve goals of supplying electrical energy at a desired voltage. The battery pack 210 is illustrated as electrically connected to a motor generator unit 220 useful to provide motive force to the vehicle 200. The motor generator unit 220 may include an output component 222, for example, an output shaft, which is provided mechanical energy useful to provide the motive force to the device 200. A number of variations to device 200 are envisioned, for example, including a powertrain, a boat, or an airplane, and the disclosure is not intended to be limited to the examples provided.

Figure 3:
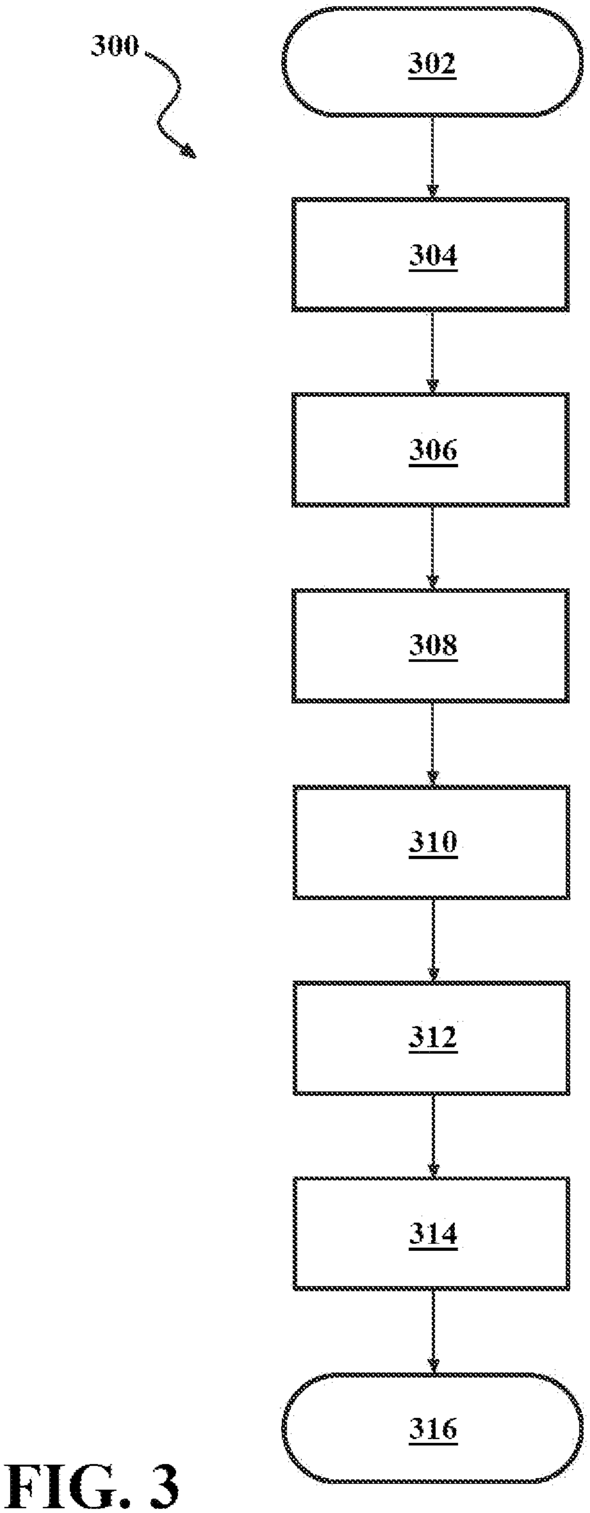
FIG. 3 is a flowchart illustrating a method for manufacturing the cathode of FIG. 1, in accordance with the present disclosure.

FIG. 3 is a flowchart illustrating a method 300 for manufacturing the cathode 120 of FIG. 1. The method 300 may in one embodiment be applied as a roll-to-roll process, wherein a first roll provides a flow of flexible, unimproved sheet of metallic conductive foil useful in sections as a cathode current collector. The method 300 may be applied, improving a first side of the flow of material and then a second side of the flow of material, wherein the improved flow of material with the dried coatings on both sides is then wound upon a second reel.

The method 300 starts at step 302. At step 304, a first cathode electrode material in a liquid solution, suspension, or slurry state is applied to a first side of a cathode current collector. At step 306, the first cathode electrode material is dried upon the cathode current collector. At step 308, the cathode current collector with the first cathode electrode material is calendared a first time or run between high pressure rollers. At step 310, a second cathode electrode material in a liquid solution, suspension, or slurry state is applied to a second side of the cathode current collector. At step 312, the second cathode electrode material is dried upon the cathode current collector. At step 314, the cathode current collector with the first cathode electrode material and the second cathode electrode material is calendared second time or run between high pressure rollers. At step 316, the method 300 ends. The method 300 is an exemplary method or process to manufacture the disclosed cathode. A number of additional and/or alternative method steps are envisioned, and the disclosure is not intended to be limited to the examples provided herein.

A cathode with a composite nickel structure for use in a battery cell is provided. The cathode includes a current collector including a first side and a second side. The cathode further includes a first cathode electrode coating the first side of the current collector, wherein the first cathode electrode includes a first relatively higher concentration of nickel. The cathode further includes a second cathode electrode coating the second side of the current collector, wherein the second cathode electrode includes a second relatively lower concentration of nickel as compared to the first cathode electrode.

In some embodiments, the first cathode electrode includes lithium nickel manganese cobalt oxide, $LiNi_{0.8}Co_{0.1}Mn_{0.1}O_2$ (NMC811).

In some embodiments, the first cathode electrode includes lithium nickel manganese cobalt oxide, $LiNi_{0.6}Mn_{0.2}Co_{0.2}O_2$ (NMC622).

In some embodiments, the first cathode electrode includes lithium nickel manganese cobalt oxide, $LiNi_{0.8}Co_{0.1}Mn_{0.1}O_2$ (NMC811), wherein the lithium nickel manganese cobalt oxide, $LiNi_{0.8}Co_{0.1}Mn_{0.1}O_2$ (NMC811), is present in a range from one percent by mass of the first cathode electrode to ninety-six percent by mass of the first cathode electrode. The first cathode electrode further includes lithium nickel manganese cobalt oxide, $LiNi_{0.6}Mn_{0.2}Co_{0.2}O_2$ (NMC622), wherein the lithium nickel manganese cobalt oxide, $LiNi_{0.6}Mn_{0.2}Co_{0.2}O_2$, (NMC622), is present in a range from one percent by mass of the first cathode electrode to ninety-six percent by mass of the first cathode electrode.

In some embodiments, the first cathode electrode includes lithium nickel manganese cobalt oxide, $LiNi_{0.6}Mn_{0.2}Co_{0.2}O_2$ (NMC622), wherein the lithium nickel manganese cobalt oxide, $LiNi_{0.6}Mn_{0.2}Co_{0.2}O_2$ (NMC622), is present in a range from one percent by mass of the first cathode electrode to ninety-six percent by mass of the first cathode electrode. The first cathode electrode further includes lithium nickel manganese cobalt oxide, $Li_{1.05}Ni_{0.33}Mn_{0.33}Co_{0.33}O_2$ (NMC111), wherein the lithium nickel manganese cobalt oxide, $Li_{1.05}Ni_{0.33}Mn_{0.33}Co_{0.33}O_2$ (NMC111), is present in a range from one percent by mass of the first cathode electrode to ninety-six percent by mass of the first cathode electrode.

In some embodiments, the first cathode electrode includes lithium nickel manganese cobalt oxide, $LiNi_{0.8}Co_{0.1}Mn_{0.1}O_2$ (NMC811), wherein the lithium nickel manganese cobalt oxide, $LiNi_{0.8}Co_{0.1}Mn_{0.1}O_2$ (NMC811), is present in a range from one percent by mass of the first cathode electrode to ninety-six percent by mass of the first cathode electrode. The first cathode electrode further includes lithium nickel manganese cobalt oxide, $Li_{1.05}Ni_{0.33}Mn_{0.33}Co_{0.33}O_2$ (NMC111), wherein the lithium nickel manganese cobalt oxide, $Li_{1.05}Ni_{0.33}Mn_{0.33}Co_{0.33}O_2$ (NMC111), is present in a range from one percent by mass of the first cathode electrode to ninety-six percent by mass of the first cathode electrode.

In some embodiments, the second cathode electrode includes lithium nickel manganese cobalt oxide, $Li_{1.05}Ni_{0.33}Mn_{0.33}Co_{0.33}O_2$ (NMC111).

In some embodiments, the second cathode electrode includes lithium iron phosphate.

In some embodiments, the second cathode electrode includes lithium manganese oxide.

In some embodiments, the second cathode electrode includes lithium nickel manganese cobalt oxide, $Li_{1.05}Ni_{0.33}Mn_{0.33}Co_{0.33}O_2$ (NMC111), wherein the lithium nickel manganese cobalt oxide is present in a range from one percent by mass of the second cathode electrode to ninety-six percent by mass of the second cathode electrode. The second cathode electrode further includes lithium iron phosphate, wherein the lithium iron phosphate is present in range from one percent by mass of the second cathode electrode to ninety-six percent by mass of the second cathode electrode. The second cathode electrode further includes lithium manganese oxide, wherein the lithium manganese oxide is present in a range from one percent by mass of the second cathode electrode to ninety-six percent by mass of the second cathode electrode.

In some embodiments, the first cathode electrode includes lithium nickel manganese cobalt oxide, $LiNi_{0.8}Co_{0.1}Mn_{0.1}O_2$ (NMC811) and lithium nickel manganese cobalt oxide, $LiNi_{0.6}Mn_{0.2}Co_{0.2}O_2$ (NMC622). The second cathode electrode includes lithium nickel manganese cobalt oxide, $Li_{1.05}Ni_{0.33}Mn_{0.33}Co_{0.33}O_2$ (NMC111), lithium iron phosphate, and lithium manganese oxide.

According to one alternative embodiment, a battery cell including a cathode with a composite nickel structure is provided. The battery cell includes an anode and a cathode. The cathode includes a current collector including a first side and a second side and a first cathode electrode coating the first side of the current collector. The first cathode electrode includes a first relatively higher concentration of nickel. The cathode further includes a second cathode electrode coating the second side of the current collector. The second cathode electrode includes one of a second relatively lower concentration of nickel as compared to the first cathode electrode or a nickel-free material. The battery cell further includes a separator and an electrolyte.

In some embodiments, the first cathode electrode includes lithium nickel manganese cobalt oxide, $LiNi_{0.8}Co_{0.1}Mn_{0.1}O_2$ (NMC811).

In some embodiments, the first cathode electrode includes lithium nickel manganese cobalt oxide, $LiNi_{0.6}Mn_{0.2}Co_{0.2}O_2$ (NMC622).

In some embodiments, the second cathode electrode includes lithium nickel manganese cobalt oxide, $Li_{1.05}Ni_{0.33}Mn_{0.33}Co_{0.33}O_2$ (NMC111).

In some embodiments, the second cathode electrode includes lithium iron phosphate.

In some embodiments, the second cathode electrode includes lithium manganese oxide.

In some embodiments, the battery cell is configured as a pouch cell, and the cathode current collector includes a conductive metal foil.

According to one alternative embodiment, a method for manufacturing a cathode with a composite nickel structure is provided. The method includes applying a first cathode electrode material to a first side of a cathode current collector and drying the first cathode electrode material to the cathode current collector. The method further includes calendaring the first cathode electrode material and the cathode current collector. The method further includes applying a second cathode electrode material to a second side of a cathode current collector and drying the second cathode electrode material to the cathode current collector. The method further includes calendaring the first cathode electrode material, second cathode electrode material, and the cathode current collector. The first cathode electrode material includes a relatively higher nickel concentration and the second cathode electrode material includes one of a second relatively lower nickel concentration as compared to the first cathode electrode material or a nickel-free material.

In some embodiments, the first cathode electrode material includes lithium nickel manganese cobalt oxide, $LiNi_{0.8}Co_{0.1}Mn_{0.1}O_2$ (NMC811) and lithium nickel manganese cobalt oxide, $LiNi_{0.6}Mn_{0.2}Co_{0.2}O_2$ (NMC622). The second cathode electrode material includes lithium nickel manganese cobalt oxide, $Li_{1.05}Ni_{0.33}Mn_{0.33}Co_{0.33}O_2$ (NMC111), lithium iron phosphate, and lithium manganese oxide.

While the best modes for carrying out the disclosure have been described in detail, those familiar with the art to which this disclosure relates will recognize various alternative designs and embodiments for practicing the disclosure within the scope of the appended claims.

What is claimed is:

1. A cathode with a composite nickel structure for use in a battery cell, the cathode comprising:

a current collector including a first side and a second side;

a first cathode electrode coating the first side of the current collector such that the first cathode electrode is in direct contact with the first side of the current collector, wherein the first cathode electrode includes a first concentration of nickel; and a second cathode electrode coating the second side of the current collector such that the second cathode electrode is in direct contact with the second side of the current collector, wherein the second cathode electrode is a nickel-free cathode electrode.

2. The cathode of claim 1, wherein the first cathode electrode includes lithium nickel manganese cobalt oxide, $LiNi_{0.8}Co_{0.1}Mn_{0.1}O_2$ (NMC811) or lithium nickel manganese cobalt oxide, $LiNi_{0.6}Mn_{0.2}Co_{0.2}O_2$ (NMC622).

3. The cathode of claim 1, wherein the first cathode electrode that includes the first concentration of nickel is a nickel-based active material defining a high-energy coating on the first side of the current collector, wherein the second cathode electrode that includes the nickel-free cathode electrode is a nickel-free active material defining a low-energy coating on the second side of the current collector, and wherein the high-energy and low energy coatings are configured to lower a magnitude of thermal energy releases and provide resistance to thermal events spreading from the battery cell to one or more similarly configured battery cells adjacent to the battery cell, the battery cell and the one or more similarly configured battery cells arranged within a same battery pack, each of the one or more similarly configured battery cells comprising a single cathode having a dual-sided current collector with one side directly coated by a nickel-based cathode electrode and another side directly coated by a nickel-free cathode electrode.

4. The cathode of claim 1, wherein the first cathode electrode includes lithium nickel manganese cobalt oxide, $LiNi_{0.8}Co_{0.1}Mn_{0.1}O_2$ (NMC811), wherein the lithium nickel manganese cobalt oxide, $LiNi_{0.8}Co_{0.1}Mn_{0.1}O_2$ (NMC811), is present in a range from one percent by mass of the first cathode electrode to ninety-six percent by mass of the first cathode electrode; and wherein the first cathode electrode further includes lithium nickel manganese cobalt oxide, $LiNi_{0.6}Mn_{0.2}Co_{0.2}O_2$ (NMC622), wherein the lithium nickel manganese cobalt oxide, $LiNi_{0.6}Mn_{0.2}Co_{0.2}O_2$, (NMC622), is present in a range from one percent by mass of the first cathode electrode to ninety-six percent by mass of the first cathode electrode, wherein the lithium nickel manganese cobalt oxide, $LiNi_{0.8}Mn_{0.2}Co_{0.2}O_2$, (NMC622) is blended with the lithium nickel manganese cobalt oxide, $LiNi_{0.8}Co_{0.1}Mn_{0.1}O_2$ (NMC811) to form a blended combination of nickel-based active materials on the first side of the current collector, and wherein the blended combination of nickel-based active materials on the first side of the current collector is present in a range from ninety percent by mass of the first cathode electrode to ninety-six percent by mass of the first cathode electrode.

5. The cathode of claim 1, wherein the first cathode electrode includes lithium nickel manganese cobalt oxide, $LiNi_{0.6}Mn_{0.2}Co_{0.2}O_2$ (NMC622), wherein the lithium nickel manganese cobalt oxide, $LiNi_{0.6}Mn_{0.2}Co_{0.2}O_2$ (NMC622), is present in a range from one percent by mass of the first cathode electrode to ninety-six percent by mass of the first cathode electrode; and wherein the first cathode electrode further includes lithium nickel manganese cobalt oxide, $Li_{1.05}Ni_{0.33}Mn_{0.33}Co_{0.33}O_2$ (NMC111), wherein the lithium nickel manganese cobalt oxide, $Li_{1.05}Ni_{0.33}Mn_{0.33}Co_{0.33}O_2$ (NMC111), is present in a range from one percent by mass of the first cathode electrode to ninety-six percent by mass of the first cathode electrode, wherein the first cathode electrode further includes a conductive filler material and a binder material to form a remaining portion of the first cathode electrode, the remaining portion constituting, four percent by mass of the first cathode electrode.

6. The cathode of claim 1, wherein the first cathode electrode includes lithium nickel manganese cobalt oxide, $LiNi_{0.8}Co_{0.1}Mn_{0.1}O_2$ (NMC811), wherein the lithium nickel manganese cobalt oxide, $LiNi_{0.8}Co_{0.1}Mn_{0.1}O_2$ (NMC811), is present in a range from one percent by mass of the first cathode electrode to ninety-six percent by mass of the first cathode electrode; and wherein the first cathode electrode further includes lithium nickel manganese cobalt oxide, $Li_{1.05}Ni_{0.33}Mn_{0.33}Co_{0.33}O_2$ (NMC111), wherein the lithium nickel manganese cobalt oxide, $Li_{1.05}Ni_{0.33}Mn_{0.33}Co_{0.33}O_2$ (NMC111), is present in a range from one percent by mass of the first cathode electrode to ninety-six percent by mass of the first cathode electrode.

7. The cathode of claim 1, wherein the second cathode electrode includes lithium-ion manganese oxide (LMO), lithium iron phosphate or lithium manganese oxide.

8. The cathode of claim 3, wherein the nickel-based active material is configured to actively respond during an initial discharge cycle of the battery cell, and wherein the nickel-free active material is configured to actively respond after the initial discharge cycle is initiated.

9. The cathode of claim 1, wherein the cathode defines a single positive electrode within the battery cell, wherein the battery cell is formed by the single positive electrode, a single negative electrode, and a single separator separating the single negative electrode from the single positive electrode, wherein the single negative electrode directly faces the single positive electrode within the battery cell, wherein the first and second cathode electrodes respectively define high energy and low energy coatings on the first and second sides of the single positive electrode, wherein the high and low energy coatings are configured to prevent thermal energy release spreading from the battery cell to adjacent battery cells in a battery pack containing the battery cell and the adjacent battery cells, and wherein the adjacent battery cells are formed similarly to the battery cell such that each adjacent battery cell includes a single cathode with alternating coatings of high energy and low energy active materials on opposing sides of a single current collector of each single cathode, the high energy active materials including nickel and the low energy active materials excluding nickel.

10. The cathode of claim 1, wherein the second cathode electrode includes lithium iron phosphate, wherein the lithium iron phosphate is present in a range from one percent by mass of the second cathode electrode to ninety-six percent by mass of the second cathode electrode; and wherein the second cathode electrode further includes lithium manganese oxide, wherein the lithium manganese oxide is present in a range from one percent by mass of the second cathode electrode to ninety-six percent by mass of the second cathode electrode, wherein the lithium iron phosphate is blended with the lithium manganese oxide to form a blended combination of nickel-free active materials on the second side of the current collector, and wherein the blended combination of nickel-free active materials on the second side of the current collector is present in a range from ninety percent by mass of the first second electrode to ninety-six percent by mass of the second cathode electrode.

11. The cathode of claim 1, wherein the first cathode electrode includes:

lithium nickel manganese cobalt oxide, $LiNi_{0.8}Co_{0.1}Mn_{0.1}O_2$ (NMC811); and lithium nickel manganese cobalt oxide, $LiNi_{0.6}Mn_{0.2}Co_{0.2}O_2$ (NMC622) blended with the lithium nickel manganese cobalt oxide, $LiNi_{0.8}Co_{0.1}Mn_{0.1}O_2$ (NMC811); and wherein the second cathode electrode includes:

lithium iron phosphate; and lithium manganese oxide blended with the lithium iron phosphate.

12. A battery cell including an electrode with a composite nickel structure, the battery cell comprising:

a single cathode defining the electrode with the composite nickel structure, the single cathode including:

a single current collector including a first side and a second side;

a first cathode electrode coating the first side of the single current collector such that the first cathode electrode is in direct contact with the first side of the single current collector, wherein the first cathode electrode includes a first concentration of nickel; and a second cathode electrode coating the second side of the single current collector such that the second cathode electrode is in direct contact with the second side of the single current collector, wherein the second cathode electrode is a nickel-free cathode electrode;

a single anode facing the single cathode, wherein the single anode includes a first current collector having a first anode electrode coating one side of the first current collector and a second anode electrode coating another side of the first current collector;

a single separator separating the single anode from the single cathode; and an electrolyte configured to provide a lithium-ion conduction path through the single separator such that ion transfer is enabled between the single anode and the single cathode via the lithium-ion conduction path of the electrolyte.

13. The battery cell of claim 12, wherein the first cathode electrode includes lithium nickel manganese cobalt oxide, $LiNi_{0.8}Co_{0.1}Mn_{0.1}O_2$ (NMC811) or lithium nickel manganese cobalt oxide, $LiNi_{0.6}Mn_{0.2}Co_{0.2}O_2$ (NMC622), wherein the first and second anode electrodes of the single anode include a silicon-based active material, and wherein the first current collector of the single anode includes a conductive metallic planar piece.

14. The battery cell of claim 12, wherein the battery cell forms part of a battery pack containing a plurality of similarly configured battery cells, and wherein the battery cell is a single battery cell among the plurality of similarly configured battery cells, each similarly configured battery cell comprising a cathode with alternating coatings of nickel-based active materials and nickel-free active materials on opposing sides of a single current collector provided by each cathode.

15. The battery cell of claim 14, wherein the battery back includes a plurality of anodes within the plurality of similarly configured battery cells, each anode having a configuration selected to compliment a respective cathode that each anode directly faces.

16. The battery cell of claim 12, wherein the second cathode electrode includes lithium iron phosphate, lithium-ion manganese oxide (LMO) or lithium manganese oxide.

17. The battery cell of claim 12, wherein the single anode comprises a configuration complimenting that of the single cathode.

18. The battery cell of claim 17, wherein the battery cell is configured as a blended pouch cell, wherein the single cathode current collector includes a conductive metal foil, and a wherein the single anode includes a thickness and a porosity selected to match a thickness and a porosity of the single cathode facing the single anode.

19. A method for manufacturing a cathode with a composite nickel structure, the method comprising:

applying a first cathode electrode material to a first side of a cathode current collector within the cathode, wherein the first cathode electrode material directly contacts the first side of the cathode current collector;

drying the first cathode electrode material to the cathode current collector;

calendaring the first cathode electrode material and the cathode current collector;

applying a second cathode electrode material to a second side of the cathode current collector such that the second cathode electrode material directly contacts the second side of the cathode current collector;

drying the second cathode electrode material to the cathode current collector; and calendaring the first cathode electrode material, the second cathode electrode material, and the cathode current collector;

wherein the first cathode electrode material is a nickel-based active material including a first nickel concentration, and wherein the second cathode electrode material is nickel-free active material devoid of nickel material.

20. The method of claim 19, wherein the second cathode electrode material is applied to the second side of the cathode current collector after drying and calendaring the first cathode electrode material, wherein the cathode is a single cathode configured to form part of a battery cell having a single anode separated from the single cathode by a single separator within the battery cell, wherein the method further comprises altering a ratio of the nickel-based active material and the nickel free active material to optimize battery performance by proximity to failure of thermal event requirements, wherein the first cathode electrode material includes:

lithium nickel manganese cobalt oxide, $LiNi_{0.8}Co_{0.1}Mn_{0.1}O_2$ (NMC811); and lithium nickel manganese cobalt oxide, $LiNi_{0.6}Mn_{0.2}Co_{0.2}O_2$ (NMC622); and wherein the second cathode electrode material includes:

lithium iron phosphate; and lithium manganese oxide.

* * * * *